(12) United States Patent
Stoner (10) Patent No.: US 6,843,165 B2
(45) Date of Patent: Jan. 18, 2005

(54) COFFEE BREWER (75) Inventor: Arthur Stoner, Pine Valley, CA (US)

(73) Assignee: STO Corporation, Riverside, CA (US)

( * ) Notice: Subject to any disclaimer, the term of this patent is extended or adjusted under 35 U.S.C. 154(b) by 0 days.

(21) Appl. No.: 10/255,022

(22) Filed: Sep. 24, 2002

(65) Prior Publication Data
US 2004/0055473 A1 Mar. 25, 2004

(51) Int. Cl.[7] .............................. A47J 31/54; A47J 31/00
(52) U.S. Cl. ........................... 99/295; 99/287; 99/302 P
(58) Field of Search ..................... 99/295, 287, 302 P, 99/302 R, 307, 304

(56) References Cited

U.S. PATENT DOCUMENTS

| 2,114,063 A | | 4/1938 | Stoner | |
|---|---|---|---|---|
| 2,529,395 A | | 11/1950 | Hummel | |
| 2,589,783 A | * | 3/1952 | Crossley et al. | 99/295 |
| 3,030,874 A | * | 4/1962 | Fiori | 99/287 |
| 3,443,508 A | | 5/1969 | Reynolds et al. | |
| 3,505,947 A | * | 4/1970 | Bresaola | 99/283 |
| 3,987,717 A | | 10/1976 | Bergmann et al. | |
| 4,103,603 A | | 8/1978 | Bergmann et al. | |
| 4,169,978 A | | 10/1979 | Hauslein | |
| 4,421,014 A | | 12/1983 | Vicker | |
| 4,546,697 A | | 10/1985 | Schaeffer | |
| 4,581,239 A | | 4/1986 | Woolman et al. | |
| 4,644,855 A | | 2/1987 | Woolman et al. | |
| 4,738,378 A | | 4/1988 | Oakley et al. | |
| 4,759,274 A | | 7/1988 | Schmidt | |
| 4,763,566 A | | 8/1988 | Paoletti | |
| 4,770,090 A | | 9/1988 | Woon et al. | |
| 4,779,520 A | | 10/1988 | Hauslein | |
| 4,784,051 A | | 11/1988 | Hauslein | |
| 4,819,553 A | | 4/1989 | Heyn et al. | |
| 4,825,042 A | | 4/1989 | Hauslein | |
| 4,838,152 A | | 6/1989 | Kubicko et al. | |
| 5,014,611 A | | 5/1991 | Illy et al. | |
| 5,070,773 A | | 12/1991 | Salomon et al. | |
| 5,115,730 A | | 5/1992 | Gockelmann | |
| 5,237,911 A | * | 8/1993 | Aebi | 99/287 |
| 5,280,560 A | | 1/1994 | Salomon | |
| 5,325,765 A | | 7/1994 | Sylvan et al. | |
| 5,370,040 A | | 12/1994 | Andrew et al. | |
| 5,379,682 A | | 1/1995 | Andrew et al. | |
| 5,539,856 A | | 7/1996 | Andrew et al. | |
| 5,840,189 A | | 11/1998 | Sylvan et al. | |
| 5,855,161 A | | 1/1999 | Cortese | |
| 5,865,096 A | | 2/1999 | Kawabata | |
| D408,679 S | | 4/1999 | Potts et al. | |
| 5,992,298 A | * | 11/1999 | Illy et al. | 99/281 |
| 6,079,315 A | | 6/2000 | Beaulieu et al. | |
| 6,082,247 A | | 7/2000 | Beaulicu | |
| 6,142,063 A | | 11/2000 | Beaulieu et al. | |
| 6,182,554 B1 | | 2/2001 | Beaulieu et al. | |
| D452,433 S | | 12/2001 | Lazaris | |
| D452,434 S | | 12/2001 | Sweeney | |
| 2001/0000570 A1 | | 5/2001 | Aarts | |
| 2001/0050002 A1 | | 12/2001 | Bonanno | |

* cited by examiner

Primary Examiner—Reginald L. Alexander
(74) Attorney, Agent, or Firm—Fulwider Patton Lee & Utecht, LLP (57) ABSTRACT A coffee brewer including a feed head for supplying pressurized brewing water to a perforated platen pressed against a packet of coffee bean grind to force such fluid in a substantially uniform flow pattern through the packet toward an outlet from a supporting tray.

55 Claims, 7 Drawing Sheets

COFFEE BREWER

BACKGROUND OF THE INVENTION

The present invention relates to coffee brewers for brewing coffee from coffee bean grind.

DESCRIPTION OF THE PRIOR ART

Brewed beverages such as hot coffee have long been a favorite beverage of consumers at home, on the job and during times of relaxation. As the market for brewed beverages has become more and more competitive, the tastes of consumers have become more discriminating.

It is long been recognized that the uniform flow of hot water through the coffee bean grind, tea leaves or the like is important to the efficient extraction of flavor for a palate pleasing brew. Numerous different efforts have been made to improve the efficiency and uniformity of extraction. These efforts can be broken up generally into the area of coffee brewers and espresso makers. Coffee brewers typically incorporate a heater for heating hot water to be flowed over the ground coffee bean. The ground bean may be contained in a perforated basket, porous envelope defining a packet or sometimes for more complicated automated systems, dispensed in a chamber lined on the bottom with a filtration strip.

Examples of efforts to improve the coffee brewing process for a more pleasing end product include the careful measurement of the flow of hot water to a brew basket carrying the coffee bean grind on a perforated disk. A device of this type is shown in U.S. Pat. No. 2,114,063 to A. M. Stoner.

Other efforts have lead to the proposal of a piston actuated coffee brewer for dispensing hot water through vertically spaced apart perforated plates having a packet of coffee bean grind contained therebetween for the free flow of hot water therethrough. A device of this type is shown in U.S. Pat. No. 2,529,395 to Hummel. Devices of this type are relatively complicated, expensive to manufacture and fail to controllably direct the hot water through the coffee packet so as to ensure relatively uniform flow throughout the coffee bean grind.

Other efforts have lead to the proposal of a coffee brew basket mounted to an overhead above a coffee decanter and including a perforated plate for receipt of the coffee grind with a distributing sieve disposed in spaced relation there above and intended to somewhat disperse the hot water to be flowed over the coffee grind. A device of this patent is shown in U.S. Pat. No. 5,115,730 to Gockelmann. While satisfactory for there intended use, such devices again fail to provide for the positive uniform flow through the coffee grounds but, rather, would typically allow for the loose coffee grind to shift about under the force of the flow from the distributing sieve thus allowing for channeling or preferential flow through specific areas of the grind without comparable flow through other areas of the grind.

Even other efforts have lead to a proposal of a brewing device including a filter basket with a agitator disposed thereover for dispensing hot water. A device of this type is shown in U.S. Pat. No. 4,779,520 to Haulsein and assigned to Alitta-Werke. Devices of this type have not generally gained acceptance in the market place.

Even further efforts have lead to a proposal that the coffee grinds be constrained in a cylinder and compressed between upper and lower perforated plates with a filter strip over the lower plate for straining the fluid and for disposing of the coffee grind when the piston is opened. A device of this type is shown in U.S. Pat. No. 5,865,096 to Kawabata. Such devices are relatively complicated, expensive to manufacture and are not readily adaptable to every day use.

Other efforts to enhance the flavor of brewed coffee have led to the development of coffee brewers incorporating specially shaped brew baskets and the like intended to control the flow of brewing water in hopes that a major portion of the water is fully distributed in a flow pattern around the interstices formed between loosely packed grind of ground coffee beans.

Discriminating customers have recognized the benefits of individual helpings of fresh brewed coffee. To this end a device has been proposed which includes an upstanding discharge tube connected with a cantileverally mounted discharge spout for dispensing hot water into a filter basket mounted on the top rim of a cup. A device of this type is shown in U.S. Pat. No. 4,770,090 to Woon et al. and is assigned to Alitta-Werke. While offering some benefits for individual brewing, devices of this type suffer the short coming that the hot brewing water is not efficiently and positively distributed through the coffee grind.

Further efforts to provide a single serving or one cup coffee brewing device includes proposals for a heating bath, dispensing nozzle and some form of non-disposable filter, such as a metal screen of the type which is intended to provide the necessary filtration.

Still efforts have led to the proposal a single cup coffee brewer including a plastic envelope for receiving the coffee grind and a pump for pumping water therethrough under pressure to break a frangible closure exposing a filter through which the brewing liquid is to be flowed.

Traditional single cup coffee brewers often include a drip filter device. Others have been proposed which include a screw type screen to trap the coffee grind so that hot water may be poured therein and to the screw type screen unscrewed a couple of turns for subsequent introduction of further hot brewing water.

In a somewhat related area, considerable work has been carried out in effort to devise satisfactory espresso coffee brewers. Those devices are typically relatively expensive and often involve high pressure steam, pressure sealing mechanisms and sophisticated mechanisms prone to frequent maintenance problems. Such espresso devices often times involve a piston and cylinder arrangement for trapping the coffee grind in sealed arrangement to force the brewing liquid therethrough for dispensation and to a espresso cup or the like. A device of this type is shown in U.S. Pat. No. 4,421,014 to Vicker.

Other devices have been proposed for brewing espresso coffee which include an automatic turn table formed with apertures for selective receipt of espresso packets to have hot water or steam force therethrough. The turn table is then advanced to forward the aperture to a discharge location where a piston will drive the packet down through the bottom of the turn table. A device of this type is shown in U.S. Pat. No. 5,855,161 to Cortese. These espresso devices are typically relatively expensive to manufacture, require some degree of skill for operation and are prone to maintenance problems. Consequently, they are typically not perceived as acceptable as coffee brewers.

SUMMARY OF THE INVENTION

In one aspect of the invention, the brewer of the present invention includes a coffee tower including a brew basket which may be in the form of a brew tray having a perforated horizontal bottom plate for support of a packet of loose coffee grind. A perforated platen rests on the coffee packet and a feed head supplies water to the platen to flow in through the platen perforations to be distributed in a controlled flow pattern through the coffee packet out through perforations in the bottom wall of the tray. In some embodiments the feed water is forced through the perforated platen under pressure to even further enhance performance. The tray may be sized for receiving the packet in close spaced relationship to support the walls of the wetted packet from bursting.

In the preferred embodiment, the platen is biased against the packet so that water through the perforations in the platen is forced to pass in a controlled pattern deep into the packet to holes in the bottom of the tray. The platen may be formed on its bottom side with seals to sealingly engage with the packet to more positively direct water flow into the grind charge contained in the packet to thereby minimize any bypass around the packet. In the preferred embodiment, the platen is carried from the bottom extremity of a vertically shiftable tube and is biased downwardly by a coil spring.

These and other features and advantages of the present invention will become apparent from the following detailed description of a preferred embodiment which, taken in conjunction with the accompanying drawings, illustrates by way of example the principles of the invention.

DETAILED DESCRIPTION OF THE PREFERRED EMBODIMENTS

Figure 1:
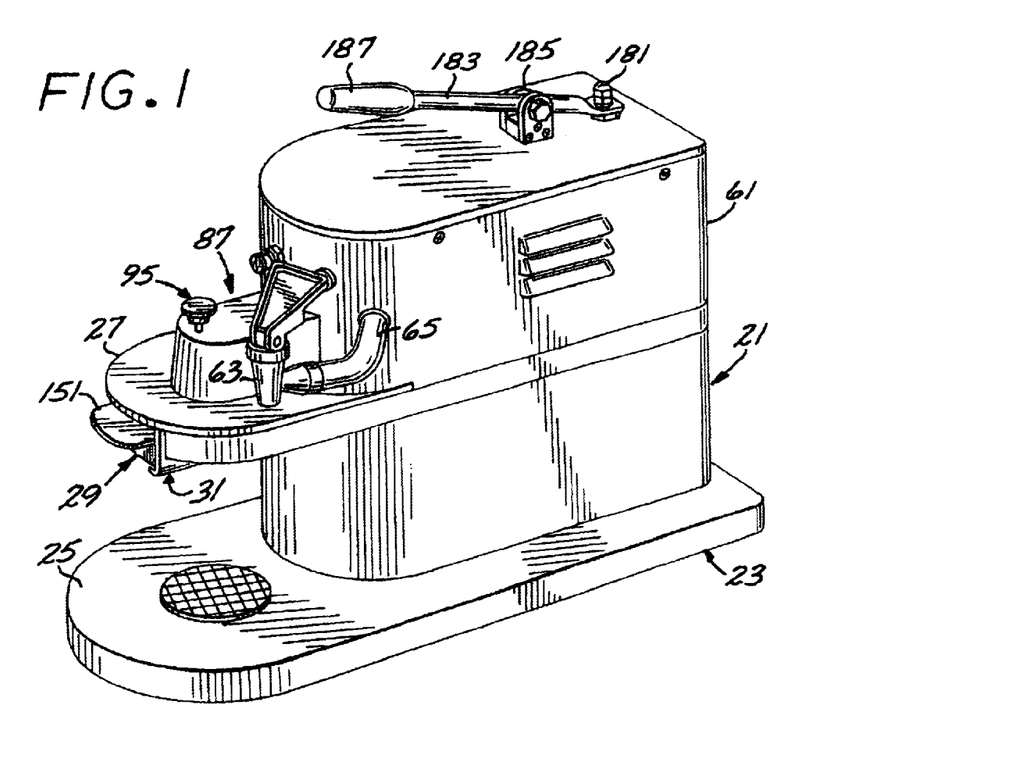
FIG. 1 is a perspective view of brewing apparatus embodying my new coffee brewer.
Figure 2:
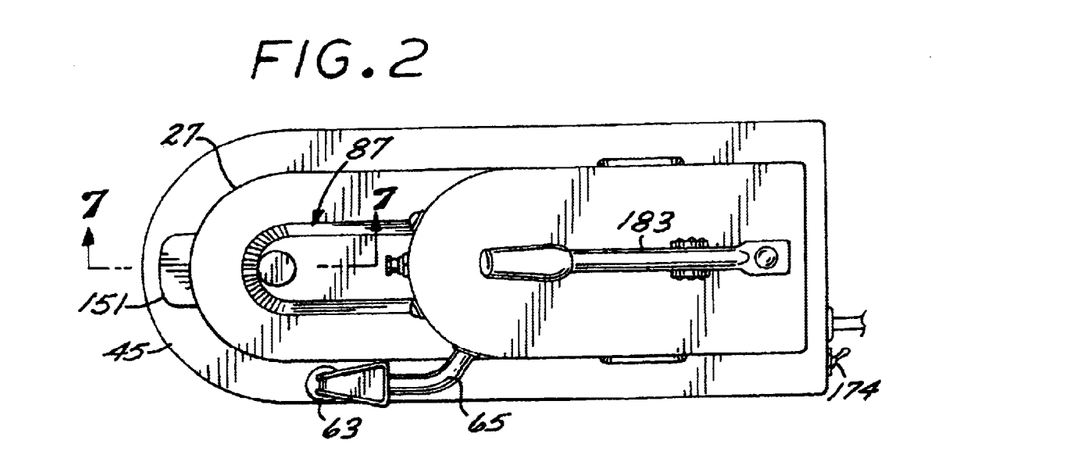
FIG. 2 is a top plan view thereof.
Figure 3:
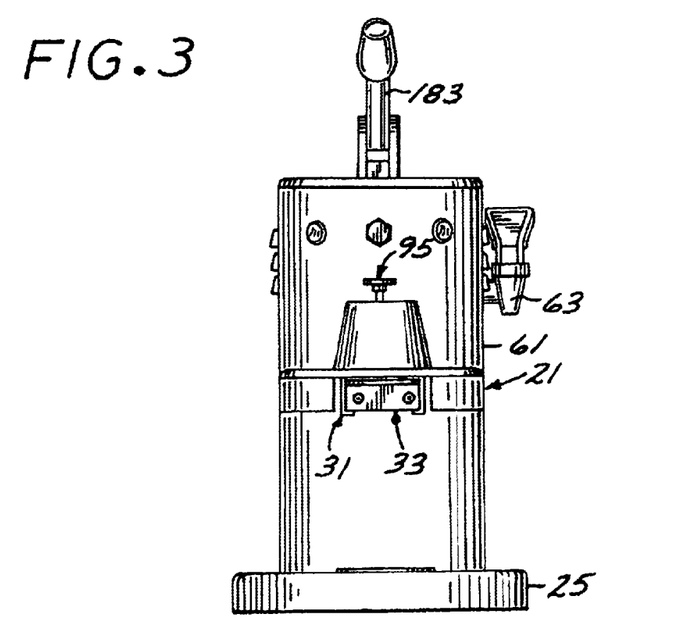
FIG. 3 is a front view thereof.
Figure 7:
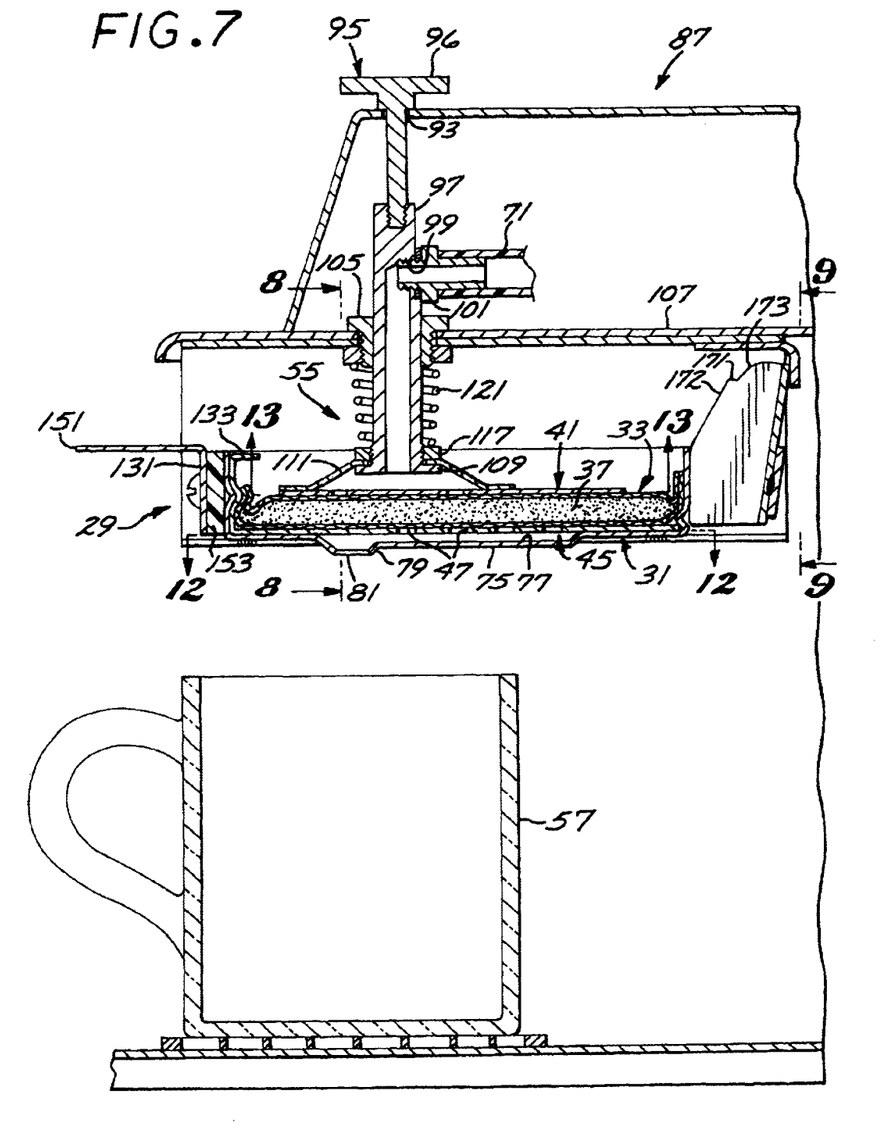
FIG. 7 is a partial vertical sectional view, enlarged scale, taken along the line 7—7 of FIG. 2.
Figure 8:
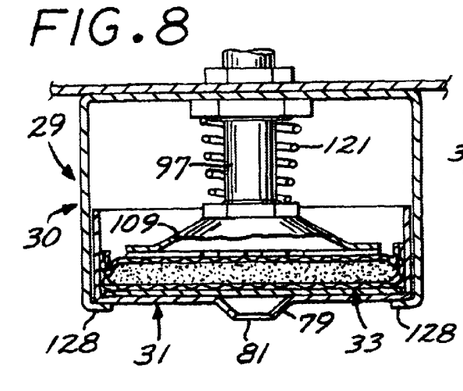
FIG. 8 is a vertical sectional view taken along the line 8—8 of FIG. 7.

The coffee brewer of the present invention includes, generally, a brewing apparatus in the form of a brewer 21 (FIG. 1) having a base 23 configured with a forwardly projecting table 25 disposed under an over hang 27 which mounts a tray hanger 30 carrying a coffee packet holder in the form of a tray assembly 29. Referring to FIGS. 7 and 8, and still speaking generally, the tray assembly 29 includes a tray device 31, for receipt of a packet 33, of coffee grind 37 to be pressed under a platen 41. The tray device 31 includes a false bottom defining a distribution plate 45 configured with a pattern of through openings 47 which cooperate with a pattern of through openings 51 in the platen 41 to direct hot water from a feed head, generally designated 55, through such holes 51, through the packet 33 and out such distribution wall 45 to be gathered in a cup 57 or other container (FIG. 7).

The brewing apparatus 21 may be in the form of a brewing tower having a heat sink tank 61 for connection to a water supply to receive and store water to be heated. A hot water spigot 63 is typically connected with a water tank by a mounting tube 65 for drawing off of hot water for tea or the like. A heating coil is typically submerged in the tank 61 and may have its outlet connected with a flexible supply tube 71 (FIG. 7) for supplying hot water to brew the coffee.

The overhang 27 may mount a brewing basket, funnel or other device acting as a tray for receiving and holding the coffee packet 33. As referred to herein, the term tray and tray device is intended to encompass all such equivalents.

Referring to FIG. 7, the brewer 21 includes a downwardly opening hood, generally designated 87 disposed on the over hang 27 in alignment over the tray. The hood 87 is formed in the forward section of its top wall with a bore 93 through which a vertical retractor plunger stem 95 projects to terminate in a head 96. Mounted to the bottom end of such stem 95 is a vertical feeder tube 97. Such tube is formed in its side wall with a threaded bore 99 into which a nipple 101 is threaded for connection to the flexible water supply tube 71. The tube 97 is telescoped through an axial bearing 105 mounted in a bore formed in the top wall 107 of the overhang to project downwardly and be formed at its bottom extremity with an outwardly flared flange 109 that mounts a plenum bonnet 111. Such bonnet 111 is in the form of an inverted cup but elongated horizontally to form a plenum chamber 113 sized and configured to capture thereunder the pattern of disbursement bores 51 formed in the platen 41.

Received in telescopical relationship over the tube 97 and interposed between the bearing 105 and the bonnet 111 is a coil compression spring 121 which, in its extended position shown in FIG. 7, exerts a force of about one pound downwardly on the bonnet and consequently the platen 41. Referring to FIG. 8, mounted under the overhang is channel shaped hanger configured on its bottom extremity in-turned lips 128 defining a track for slidably receiving the tray device.

Figure 12:
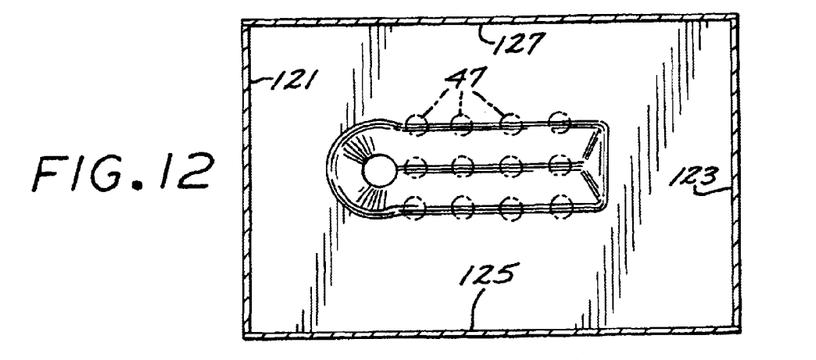
FIG. 12 is a horizontal sectional view taken along the line 12—12 of FIG. 7.

Referring to FIGS. 7 and 12, the tray device 31 is formed with a collector bottom wall 75 upwardly turned front back and side walls 121, 123, 125 and 127 (FIG. 12) configured to receive in close fitting relationship the periphery of the coffee grind packet 33 (FIGS. 7 & 8). In a preferred embodiment, the tray is approximately 2½' inches wide and 3½' inches long. The coffee grind packet 33 may be custom made to closely fit the interior of the tray and be retained by the side, back and front walls thereof to be supported against outward spreading thereof in the lateral and forward rearward directions. The tray itself is in the preferred embodiment, constructed with the collector bottom wall 75 lined by the false bottom distribution plate 45 and formed centrally with an elongated trough 77 leading to a downwardly opening funnel shaped dimple 79 terminating in a outlet opening 81 centered over the container 57.

Referring to FIG. 7 mounted on the front of the tray is an L shaped angel handle 151 which is thermally insulated from such handle by means of a thermal insulation strip 153 to minimize heat transfer from the tray to the handle.

In the preferred embodiment, the distribution plate 45 is a metallic plate serving as a false bottom in the tray and formed at its forward extremity with an upturned tongue 131 forming the forward wall of the tray compartment and turned back to form a rearwardly projecting lip 133 underneath which the forward extremity of packet 33 may be trapped as shown in FIG. 7. The rearward corners of such plate may be turned down slightly to contact the bottom wall 75 of the tray to cooperate in spacing the body of such plate about 1/64" above such bottom wall for ready flow of brewed water under the plate to collect in the trough 77 (FIGS. 7 & 8).

Figure 13:
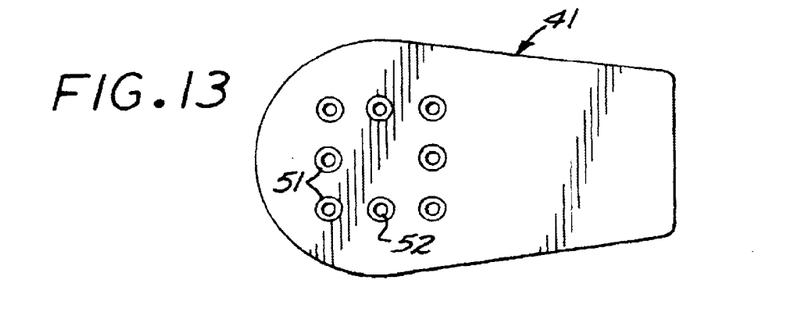
FIG. 13 is a horizontal sectional view taken along the line 13—13 of FIG. 7.

As will be appreciated by those skilled in the art, the platen 41 itself may take many different shapes and forms such as rectangular, triangular, circular, oval or any other convenient shape. In the exemplary embodiment, the platen is shown in plan view in FIG. 13 rounded at its forward end and formed with its opposite sides tapering inwardly and rearwardly toward one another. Preferably, such platen is formed with downwardly depressed funnel shaped dimples 52 concentric with the openings 51 to terminate at their respective bottom ends in circular edges which are pressed into the top side of the packet to sealingly engage therewith.

As shown in FIG. 12, the disbursement plate 45 is formed with the holes 47 arranged in a pattern defining three longitudinal rows of four, spaced laterally apart. The pattern of holes 51 in the platen 41 are also arranged in a rectangular pattern with three on a side such that when disposed in compressing relationship over the packet 33 the water flowing through such holes will, while being disbursed through the coffee bean grind, tend to flow in a disbursement pattern which is generally rectangular and will flow through and through the outlet disbursement holes 47 such that the generally rectangular pattern of the arrangement of holes cooperate to maintain a generally rectangular overall pattern of flow which compliments the rectangular shape of the packet 33 and the rectangular tray 31.

As it will be appreciated by those skilled in the art the pattern of holes in the platen 41 and disbursement wall 45 may take many different shapes and forms, it only important that they cooperate together to facilitate a relatively thorough wash of the grind in the packet 33. As an example, if the tray where in a form of a circular or oval basket, it would be preferred that the holes be likewise arranged in a circular or oval pattern as the case may be.

Figure 9:
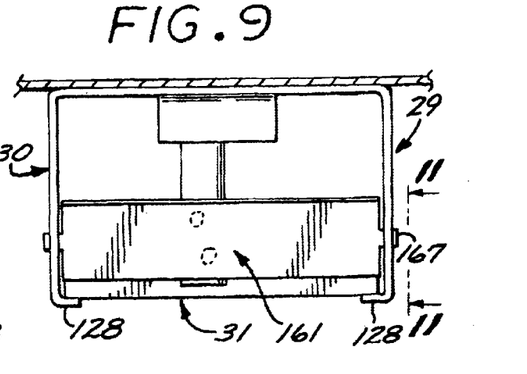
FIG. 9 is a vertical sectional view taken along the line 9—9 of FIG. 7.
Figure 10:
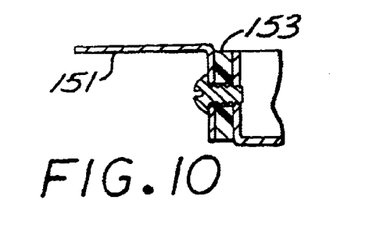
FIG. 10 is a detail view of a tray handle included in the brewer shown in FIG. 7.
Figure 11:
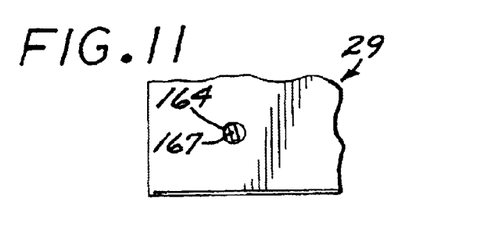
FIG. 11 is a partial side view taken along the line 11—11 of FIG. 9.

Mounted to the rear of the hanger 31 is a platen catch device, generally designated 161 (FIGS. 14 and 15) for selectively catching the rear edge of the platen to hold it in an elevated position. Such catch device includes a laterally projecting pivot strip 165 terminating at its opposite ends in respective tangs 167 for receipt in respective bores 164 (FIGS. 9 and 11) formed in the opposite side walls of the hanger 31. Mounted on the front side of such pivot strip 165 and disposed centrally thereon is an upright catch post 171 which is weighted to tilt forwardly at the top. The post is formed on its front edge with an upwardly and rearwardly angled cam surface 172 disposed in the path of the tray. Such rearwardly inclined cam surface 172 terminates at its upper end in a notch 173 configured with a upwardly facing shoulder 175 which, when the top end of the post is tilted forward as shown in FIG. 14, is disposed in the vertical path of the platen to engage under the rear extremity to hold such platen in its elevated position shown in FIG. 14 above the top extremity of the tray.

Figure 4:
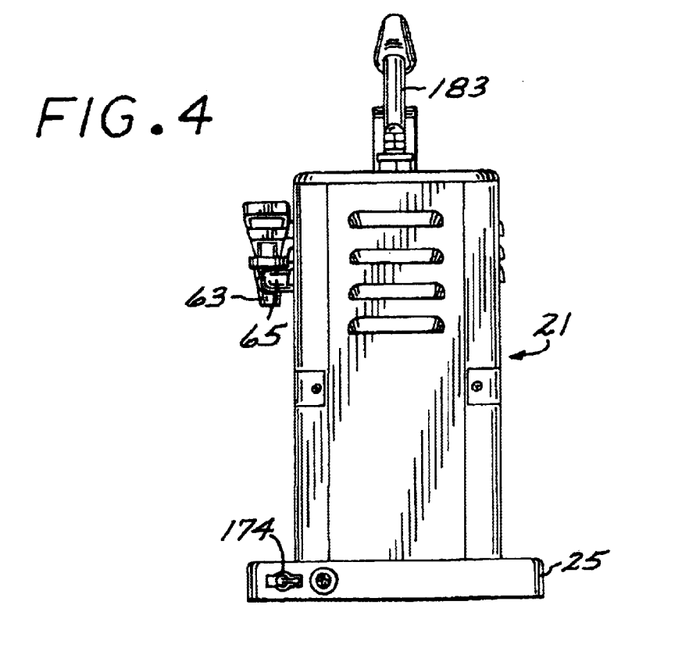
FIG. 4 is a rear view thereof.
Figure 5:
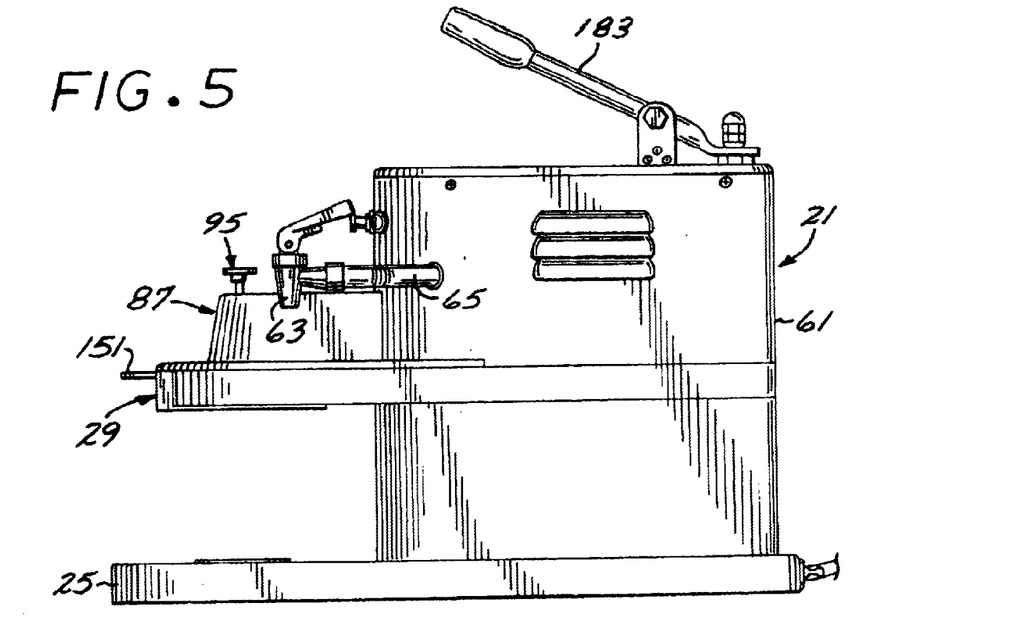
FIG. 5 is a right-hand side thereof.
Figure 6:
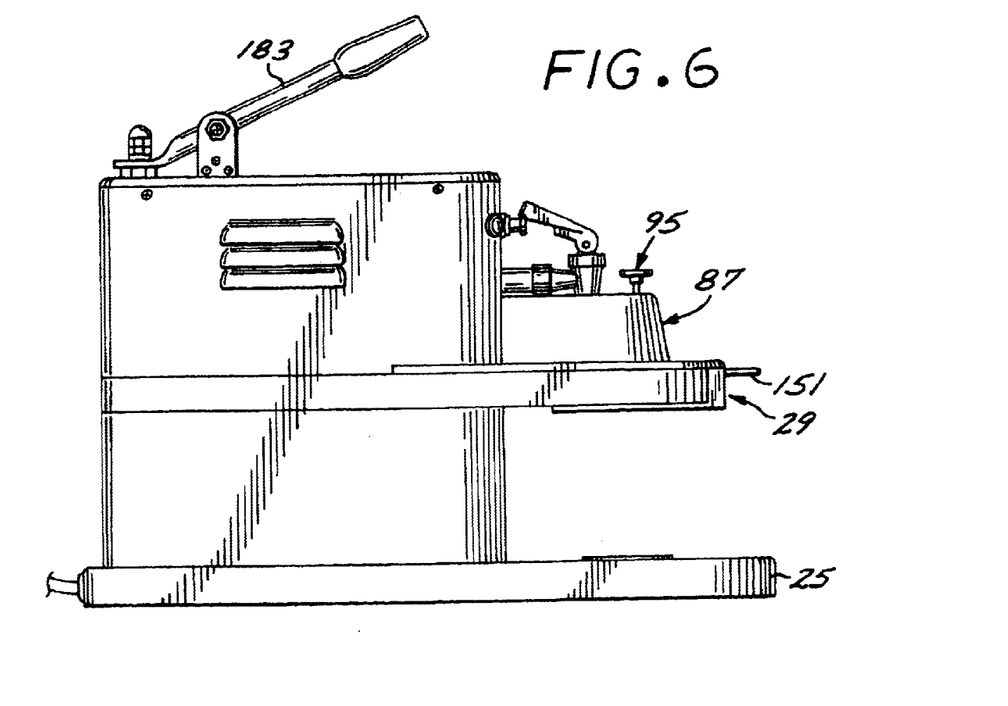
FIG. 6 is a left-hand side thereof.

Mounted in the tank 61 is conventional plumbing and electrical circuitry (not shown), including control circuitry having an on/off switch 174 (FIG. 4) and a central processing unit (CPU) which is operative to actuate a heater to heat the water bath and maintain such baths at an elevated temperature. Conveniently, the control circuit includes a start switch connected with a vertical plunger rod 181 (FIG. 1) connected with one end of a control handle 183 carried from a fulcrum clevis 185 and having a handle grip 187 on the free extremity thereof. As will be appreciated, such handle simulates a pump handle.

In operation, the coffee brewer of the present invention may be powered by actuating the on/off switch 174 to actuate the control circuitry and energize the CPU and consequently, the water heater. Once the water is heated, the brewer is ready for the brewing process.

Figure 14:
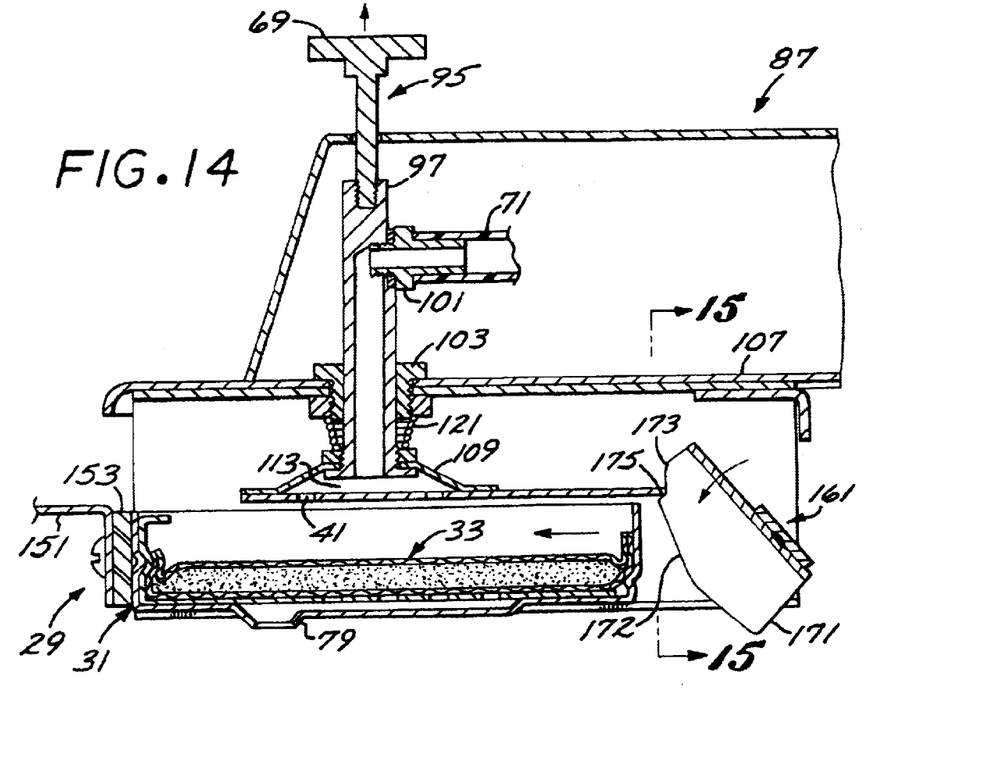
FIG. 14 is a partial vertical sectional view similar to FIG. 7 showing the platen in its raised position.
Figure 15:
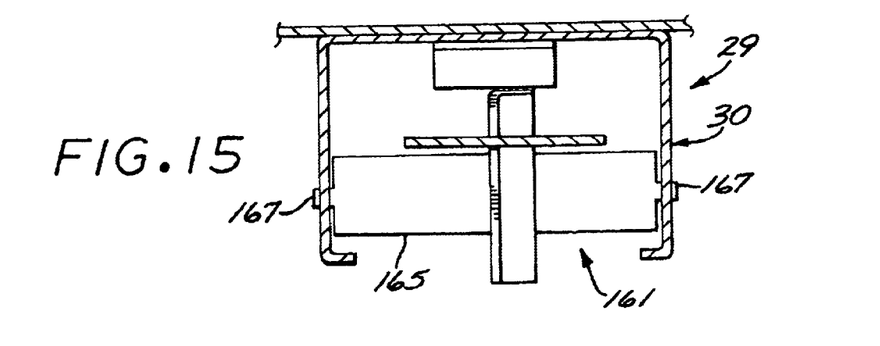
FIG. 15 is a vertical sectional view taken along the line 15—15 of FIG. 14.

The head 96 of the plunger stem 95 carrying the inlet tube 97 may b drawn upwardly to raise the platen 41 to the elevated position shown in FIG. 14. I will appreciated that the rear edge of such platen 41 will ride upwardly on the cam surface 172 of the catch post to the point where the platen is of the same elevation as the shoulder 175, at which time such post 171 will tilt further forwardly at the top extremity to the position shown in FIG. 14 thus engaging such shoulder under the rear edge of such platen to hold it in its elevated position. The handle 151 of such tray may be grasped and to draw the tray forwardly out from under the platen to clear the hanger 31 and, if desired, be removed clear of the hanger. A grind packet 33 may then be selected and inserted in the tray to act as a basket for holding such packet. The tray may the be reintroduced under the platen by sliding it into the hanger 31 to shift it rearwardly under the platen causing the rear end thereof to engage the cam surface 172. The as the tray is pushed further rearwardly, the post 171 will be rotated in the clockwise direction as viewed in FIG. 14 about the pivot axis defined by the tangs 167 (FIG. 15) thus driving the upper extremity of the post rearwardly to the position in FIG. 7. As the tray reaches the point where it is aligned under the platen the post will have been rotated rearwardly to release such platen, once the shoulder 175 clears the rear edge of such platen will be to free to be driven downwardly onto the packet 33 by gravitational force combined with the spring 121. This then serves to press the packet firmly in place in the tray with the grind having a depth of about, as an example 1/8".

The handle 183 may then be actuated by pressing downwardly on the grip 187 to raise the actuating plunger 181 to close the actuation switch to communicate water through a conventional heat exchange coil and out the flex tube 171 into the feed tube 97 (FIG. 7). Such water will then flow downwardly in such tube into the plenum chamber and through the platen openings 41. As the water pump fills up the pressure in such plenum chamber, the water will be forced downwardly through the grind in the packet 33 from where it will seek to escape via the pattern of disbursement holes 47 in the distribution wall 45.

It will be appreciated the weight of the platen, feeder tube and the force of the coil spring 121 will serve to force the platen downwardly thus driving the bottom ends of the dimples 52 positively into the top wall of the packet 33 thus forming respective seals therewith such that disbursing water is forced into the packet thereby preventing escape across the top surface of the packet which may otherwise result in bypass of the grind within such packet. The water will be forced through a series of tributary—like flow paths, circulating about the grinds in a relatively uniform flow pattern to escape out the openings in the distribution platen to be gathered thereunder and flow down the trough to the outlet opening 81. It will also be appreciated that the platen may be turned downwardly at its peripheral edges to form a peripheral seal to cooperate with the dimples 52 or, in lieu thereof, to cooperate in directing water into the packet.

As will be appreciated by those skilled in the art, the rectangular pattern of the flow from the platen holes 51 will be directed to a great extent in a rectangular pattern substantially uniformly through the packet toward the rectangular pattern of holes 47 in the distribution plate thus providing for positive washing of the grind within the packet 33. Obviously, some of the hot water will concurrently flow to the other areas of the grind within such packet thus resulting in a relatively effective and complete wash of flavor from such grind.

As the grind is wetted it will expand thus enlarging the overall volume of the grind within the packet causing the volume of the packet itself to grow. As the volume of grind grows, the walls of the tray will support peripheral walls of the packet against lateral and forwardly and rearwardly expansion thus providing support against the walls of the packet themselves bursting the increased volume. Meanwhile, the spring 121 will accommodate such growth allowing the platen 33 to be raised as the volume of the grind grows thereby minimizing any tendency of the growth to place excess stress on the packet and burst the walls of the packet but still maintaining a positive pressure downwardly on the platen to maintain effective sealing engagement between such platen and the top surface of the packet.

A control meter within the flow circuit will control flow of the water to efficiently and effectively extract the desired flavoring from the grind and fill the coffee cup 57. When a sufficient volume of water has been dispensed to fill the cup 57, or other container selected, to the desired level, the flow control meter will close the control valve in the plumbing to discontinue flow. The user may then remove the cup and enjoy a helping of freshly brewed coffee.

The plunger head 96 may then be grasped to raise the feeder tube 97 and consequently the platen 33 to free the tray to be removed for removable of the spent packet 33. The next user may then insert a new packet of coffee of the desired flavor and promptly repeat the process. As will be appreciated by those skilled in the art, the reserve of heat in the water within the tank 61 will typically provide sufficient heat to provide eight to ten cups of water to be consecutively drawn from the heat exchange tube in rapid succession without any extensive delay in time for reheating of the water bath. This then allows for the brewer to typically stand ready for dispensing of water for efficient and effective brewing of the coffee.

The brewing apparatus of the present invention may take many different forms. The device may be incorporated, in, for instance, a claim actuated coffee dispenser where the basket for tray is mounted over a cup table which will receive a dispensed cup since the apparatus may include an automatic packet dispenser which is responsive coins, bills, or credit cards or the like of the selected denomination to dispense a selected packet into the tray or basket and the platen automatically lowered into position constraining the packet within the tray. Further, it will be recognized that the feed head formed by the plenum chamber and platen holes 51 may take many different forms, including an open feed head to spray water under gravity flow for flowing through the packet and trapped under the platen or any other desirable configuration known to those skilled in the art or which may be developed in the future.

The shape and construction of the tray holding device and the tray itself may also take many different forms. The tray holding device may be in the form of a hanger, hook, plate or any other desired support. The tray may be in the form of a basket or any other coffee packet holding mechanisms presently known to those working in the art or which might be developed in the future. It will be appreciated that the size and the shape of the tray itself may take many different forms. It maybe eleptical, cylindrical or any other desired shape to facilitate efficient brewing from the coffee bean grind. The shape and configuration of the platen may also vary. The holes in the platen may vary shape, configuration and in their pattern. As an example, the holes may be arrayed in a eleptical, round or any other desired pattern such as Figure "8" to provide for efficient disbursement of the water forced to spray therethrough. While there is benefit to the pattern of holes in the platen complimenting the horizontal shape of the tray and the pattern of the holes in the false bottom thereof, such pattern may vary in many different configurations that will be apparent to those skilled in the art and which will be effective to provide for efficient and effective brewing. Such holes may be formed by corregations, grooves or other fluid dispensing structure which will serve to provide for preferential release of the brewed fluid from the packet from disbursed points and locations across the bottom of the packet. The term distribution holes used here is intended to encompass plates with all such constructions, whether acting as the bottom wall for the tray opening directly downwardly on a decanter or cap or as a false bottom as specifically described herein.

Figure 16:
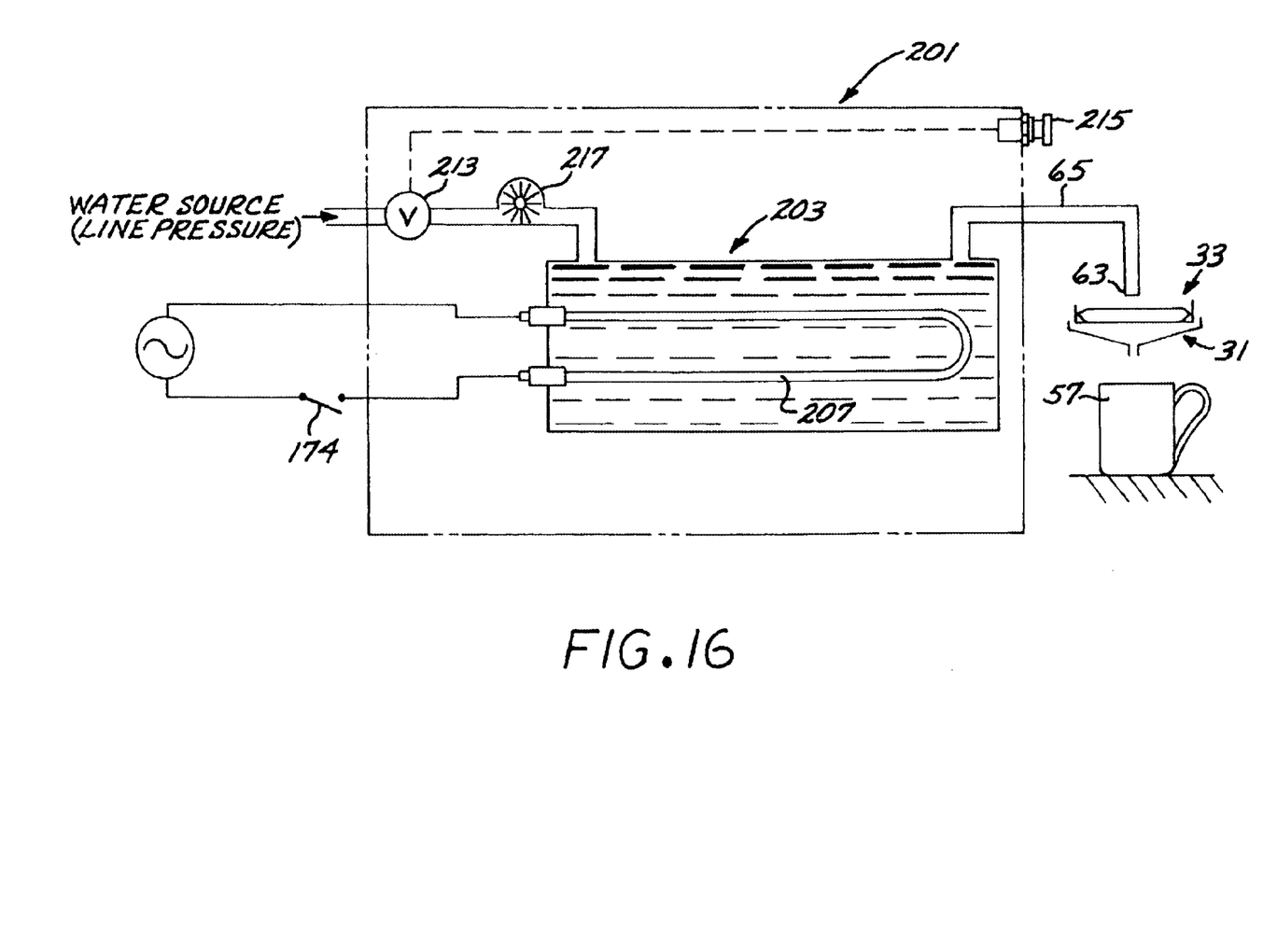
FIG. 16 is a diagramatic view of a second embodiment of the beverage brewing apparatus of the present invention.

The coffee brewer apparatus shown in FIG. 16 is similar to that set forth in FIGS. 1–15 except that it is a smaller model and includes a flow through heating device. The apparatus, generally, includes a housing or cabinet 201 which houses a water heater tube 203 that is about 2 inches in diameter and about 8 inches long. The heater tube 203 forms a cylindrical water tank in which is mounted a heating coil 207 connected in circuit with the control switch 174. The tube 203 holds about 8 ounces of water and the heating coil 207 produces about 1800 watts of heat to thus maintain the water at about 200°. It has been found that the device will brew a generous cup of coffee in approximately one minutes time. The pressurized water line is connected with the heating tube 203 through a control valve 213 controlled by a push button control 215 to control flow through meter 217 into the inlet of such heating tube 203. The outlet of such heating tube is connected to the tube 65 to the spray head 63.

With this apparatus, when it is desirable to brew a single cup of coffee, the switch button 215 may be depressed to actuate the valve 213 an open such valve for a selected period of time as dictated by a controller (not shown) to introduce pressurized water and to the heater tube 203. Such pressurized water will replace a volume of heated water corresponding with the volume of a cup 57 causing such heated water to be driven through the tube 65 for flow through the grind packet and dispersing openings.

From the foregoing it would be apparent that the coffee brewing apparatus and method of the present invention provide a highly effective means for efficiently extracting a flavor from coffee grind to make full use of the grind while providing for rapid brewing.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A beverage brewer for brewing a beverage from a grind in a porous wall packet of a predetermined shape and comprising:
   a brew device including a beverage container table for receiving a beverage container and an overhead mounting a feed head spaced there above for emitting brewing liquid;
   a tray holder mounted below the feed head;
   an upwardly opening tray carried from the holder and including a perforated distribution plate and upstanding side walls defining a compartment configured to receive the packet with one side facing upwardly;
   a platen carried from the overhead, sized to be received in such compartment, formed with a pattern of dispersing openings arrayed there across for flow of liquid from such feed head to be dispersed over such one side of such packet; and
   a spring biasing the platen downwardly.

2. The beverage brewer of claim 1 wherein:
   the platen is biased downwardly against the packet with sufficient force to compress the grind tending to force it laterally outwardly; and
   the tray is configured with the side walls cooperating to complimentary receive the packet in close fit relationship to support the sides of the packet as the platen is biased downwardly to force the charge laterally outwardly.

3. The beverage brewer of claim 1 wherein:
   the holder includes a horizontal track;
   the tray is in the form on an open top box received slidably on the track and operable to be slid from a brew position under the feed head to a loading position clear of such feed head.

4. The beverage brewer of claim 1 for use with a packet having, when received in the tray a horizontal periphery of a selected configuration and wherein:
   the platen is formed with the openings arrayed in a pattern complimenting the selected configuration.

5. The beverage brewer of claim 1 for use with a packet formed with a rectangular selected configuration and wherein:
   the platen is formed with the openings arrayed a rectangular pattern.

6. The beverage brewer of claim 1 wherein:
   the platen is formed on its underside with respective seals surrounding the respective openings for engaging and sealing against the one side of the packet.

7. The beverage brewer of claim 1 that includes:
   a vertical tube mounted from such overhead for vertical reciprocation with respect thereto and mounting the platen at the bottom extremity thereof.

8. The beverage brewer of claim 1 wherein:
   the spring is a coil spring disposed coaxially about the tube to bias the platen downwardly.

9. The beverage brewer of claim 7 that includes:
   a flexible fluid conduit connected on one end with the tube and wherein;
   the tube is connected with the feed head.

10. The beverage brewer of claim 1 wherein:
    the spring is operative to bias the platen downwardly with a substantially one pound of force.

11. The beverage brewer of claim 1 that includes:
    a catch device for locking the platen in an elevated position relative to the tray.

12. The beverage brewer of claim 1 that includes:
    a feed tube for feeding hot water;
    a bonnet connecting the outlet of the tube with the platen.

13. The beverage brewer of claim 12 wherein:
    the bonnet covers the dispersing openings and cooperates with such platen to form a plenum chamber for containing water to be dispersed out the openings.

14. The beverage brewer of claim 1 wherein:
    the platen is formed with such openings arrayed thereabout in a pattern complimenting the shape of such compartment.

15. The beverage brewer of claim 12 that includes:
    a vertical tube movably mounted from the overhang for vertical travel relative thereto;
    the platen being mounted to the lower extremity of such tube for vertical upward shifting as the grind swells.

16. The beverage brewer of claim 13 that includes:
    a stem projecting upwardly from the tube and including a hand grasp to be grasped for raising of the platen off the packet.

17. The beverage brewer of claim 13 wherein:
    the spring is a compression coil spring biasing the platen downwardly toward the tray.

18. A brewer as set forth in claim 1 wherein:
    the distribution plate includes distribution holes in the platen and in the bottom wall of the tray.

19. The beverage brewer of claim 1 wherein:
    the spring is a single spring located centrally over the platen.

20. The beverage brewer of claim 1 that includes:
    a heat exchange tube connected with the feed head; and
    a heater disposed in heat relationship with such tube.

21. The beverage brewer of claim 20 that includes:
    a feed line connected with such tube; and
    a meter for metering the flow of brewing fluid through such heating tube.

22. A coffee brewer comprising:
    a tower including a container table and an overhang spaced there above;
    a coffee packet including a porous envelope containing a sufficiently large charge of coffee grind to fill such envelope to a selected depth, such grind being responsive to moisture to swell and increase such selected depth;
    a feed head mounted on the tower for applying water to such packet;
    a tray interposed between the feed head and configured with a compartment sized to support the lateral sides of such envelope against lateral outward expansion, the tray further including a perforated bottom wall;
    a platen resting on the packet and formed with disbursement opening for receipt and flow of water from the feed head to disperse water down through the interstices formed between such grind and through the perforations in such bottom wall; and
    a spring biasing the platen downwardly against such packet to maintain such platen pressed against such packet as water is flowed from feed head through the openings into the charge of coffee grind.

23. A beverage brewer for brewing a beverage from a grind in a porous wall packet and comprising:
    a brew device including a tray holder;
    an upwardly opening tray carried from the holder and including a perforated distribution plate and upstanding side walls defining a compartment configured to receive the packet;

a platen disposed over the tray, sized to be received downwardly in the compartment, shiftable between a retracted position disposed above the compartment and a working position received in such compartment to engage the packet in such compartment, the platen including dispersing openings for flow of liquid;

a feed head located above such tray and arrange to spray liquid into such compartment; and a spring for biasing the platen downwardly against The packet in such compartment.

24. A beverage brewer for brewing a beverage from a grind in a porous wall packet and comprising:

a brewer housing;

a liquid distribution head for distributing liquid downwardly through a flow path;

a container in the flow path for receiving liquid from the distribution head;

a tray interposed in the flow path above the container and having in an upwardly opening compartment for receipt of the packet to be positioned in such flow path to receive flow from the head, the tray including a perforated bottom wall;

a platen carded from such brewer housing over the tray and configured to be moved between an elevated position and a lowered position pressing on the packet disposed in such container that platen being biased downwardly to the lowered position; and a retractor acting independent of fluid flow for retracting such platen from its lowered position to its elevated position whereby the retractor may be activated to retract the tray, the packet placed in the tray and the refractor activated to release the platen to be lowered independent of fluid flow through the distribution head to be pressed against the packet and thereafter fluid flowed through the distribution head.

25. A beverage brewer for brewing a beverage from a grind in a porous wall packet of a predetermined shape and comprising:

a brew device including a beverage container table for receiving a beverage container and an overhead mounting a feed head spaced there above for emitting brewing liquid;

an tray holder mounted below the feed head;

an upwardly opening tray carried from the holder and including a perforated distribution plate and upstanding side walls defining a compartment configured to receive the packet with one side facing upwardly;

a platen carried from the overhead, sized to be received in such compartment, formed with a pattern of dispersing openings arrayed there across for flow of liquid from such feed head to be dispersed over such one side of such packet, such platen further being biased downwardly; and a catch device for locking the platen in an elevated position relative to the tray.

26. A coffee brewer for brewing coffee grind contained in a packet with a porous envelope and comprising;

a brew tower including a container table with an overhang disposed thereover; feed head means on the overhang;

tray means interspersed between the feed head means and the table and including constraining means for constraining the packet from expanding horizontally;

platen means;

spring means for mechanically biasing the platen downwardly; and flow distribution means in the platen means and tray means for directing flow from such feed head to be distributed substantially evenly through the grind in the packet toward the table.

27. A method of brewing a beverage from a grind in a porous wall packet including:

selecting a brewing device including a holding device for holding a porous wall packet of grind and having a perforated bottom wall;

selecting a perforated platen and a spring;

employing the spring to press the perforated platen downwardly on such packet;

flowing fluid through the perforated platen, packet and out the perforations in the bottom wall to distribute flow essentially evenly through the packet while the packet is compressed between the platen and bottom wall; and raising the platen against the bias of the spring to release the packet.

28. The method of claim 27 that includes:

flowing fluid around the periphery of the platen.

29. A one cup beverage brewer for brewing a beverage from a grind in a porous wall packet of a predetermined shape containing a quantity of such grind sufficient to brew a one cup beverage and comprising:

a brew device including a beverage container table for receiving a coffee cup and an overhead mounting a feed head spaced there above for emitting brewing liquid;

a tray holder mounted below the feed head;

an upwardly opening tray carried from the holder and including a perforated distribution plate and upstanding side walls defining a compartment configured to receive the packet with one side facing upwardly;

a platen carded from the overhead, sized to be received in such compartment, formed with a pattern of dispersing openings arrayed there across for flow of liquid from such feed head to be dispersed over such one side of such packet, such platen further being biased downwardly; and a catch device a for locking the platen in an elevated position relative to the tray.

30. The one cup beverage brewer of claim 29 wherein:

the platen is biased downwardly against the packet with sufficient force to compress the grind tending to force it laterally outwardly; and the tray is configured with the side walls cooperating to complementary receive the packet in close fit relationship to support the sides of the packet as the platen is biased downwardly to force the charge laterally outwardly.

31. The one cup beverage brewer of claim 29 wherein:

the holder includes a horizontal track; and the tray is in the form on an open top box received slidably on the track and operable to be slid from a brew position under the feed head to a loading position clear of such feed head.

32. The one cup beverage brewer of claim 29 for use with a packet having, when received in the tray, a horizontal periphery of a selected configuration and wherein:

the platen is formed with the openings arrayed in a pattern complimenting the selected configuration.

33. The one cup beverage brewer of claim 32 for use with a packet formed with a rectangular selected configuration and wherein:

the platen is formed with the openings arrayed a rectangular pattern.

34. The one cup beverage brewer of claim 29 wherein:
the platen is formed on its underside with respective seals surrounding the respective openings for engaging and sealing against the one side of the packet.

35. The one cup beverage brewer of claim 29 that includes:
a vertical tube mounted from such overhead for vertical reciprocation with respect thereto and mounting the platen at the bottom extremity thereof.

36. The one cup beverage brewer of claim 35 that includes:
a coil spring disposed coaxially about the tube to bias the platen downwardly.

37. The one cup beverage brewer of claim 35 that includes:
a flexible fluid conduit connected on one end with the tube and wherein the tube is connected with the feed head.

38. The one cup beverage brewer of claim 29 wherein:
the platen is biased downwardly with a substantially one pound of force.

39. The one cup beverage brewer of claim 29 that includes:
a feed tube for feeding hot water; and
a bonnet connecting the outlet of the tube with the platen.

40. The one cup beverage brewer of claim 39 wherein:
the bonnet covers the dispersing openings and cooperates with such platen to form a plenum chamber for containing water to be dispersed out the openings.

41. The one cup beverage brewer of claim 39 wherein:
the platen is formed with such openings arrayed thereabout in a pattern complimenting the shape of such compartment.

42. The one cup beverage brewer of claim 39 that includes:
a vertical tube movably mounted from the overhang for vertical travel relative thereto; and
the platen being mounted to the lower extremity of such tube for vertical upward shifting as the grind swells.

43. The one cup beverage brewer of claim 40 that includes:
a stem projecting upwardly from the tube and including a hand grasp to be grasped for raising of the platen off the packet.

44. The one cup beverage brewer of claim 40 that includes:
bias means biasing the platen means downwardly toward the tray means.

45. The beverage brewer of claim 29 that includes;
a heat exchange tube connected with the feed head; and
a heater disposed in heat relationship with such tube.

46. The beverage brewer of claim 45 that includes a feed line connected with such tube; and
a meter for metering the flow of brewing fluid through such heating tube.

47. A one cup beverage brewer for brewing a beverage from a grind in a porous wall packet of a predetermined shape containing a quality of such grind to brew a one cup beverage and comprising:
a brew device including a beverage container table for receiving a coffee cup and an overhead mounting a feed head spaced there above for emitting brewing liquid;
a tray holder mounted below the feed head;
an upwardly opening tray carried from the holder and including a perforated distribution plate and upstanding side walls defining a compartment configured to receive the packet with one side facing upwardly; and
a platen carried from the overhead, sized to be received in such compartment, and to cooperate with the upstanding side walls to define a clearance space between the peripheral edges of the platen and side walls, formed with a pattern of dispersing openings arrayed there across for flow of liquid from such feed head to be dispersed over such one side of such packet, such platen further being biased downwardly.

48. The one cup beverage brewer of claim 47 that includes:
a spring biasing such platen downwardly.

49. A one cup coffee brewer comprising:
a tower including a container table and an overhang spaced there above;
a coffee packet formed by a porous envelope containing a sufficiently large charge of coffee grind to fill such envelope to a selected depth, and to brew one cup of coffee such grind being responsive to moisture to swell and increase such selected depth;
a feed head mounted on the tower for applying water to such packet;
a tray interposed between the feed head and configured with a compartment sized to support the lateral sides of such envelope against lateral outward expansion, the tray further including a perforated bottom wall;
a platen resting on the packet and formed with disbursement openings for receipt and flow of water from the feed head to disperse water down through the interstices formed between such grind and through the perforations in such bottom wall; and
a spring biasing the platen downwardly against such packet to maintain such platen pressed against such packet as water is flowed from feed head through the openings into the charge of coffee grind.

50. A one cup coffee brewer comprising:
a tower including a container table for receiving a coffee cup and an overhang disposed thereover;
a feed head mounted on the overhang;
a tray interposed between the feed head and table for receipt of a packet of coffee grind;
a platen for floatable receipt on the packet when received in the tray; and
flow distribution means including distribution holes in the platen and in the bottom wall of the tray for receiving fluid flow from the feed head to direct it in controlled flow distribution through the packet toward the table.

51. The one cup beverage brewer of claim 50 that includes:
the distribution means includes bias means biasing the platen toward the bottom wall of the tray.

52. A one cup beverage brewer for brewing a beverage from a predetermined charge of grind of quantity sufficient to brew a one cup beverage and comprising:
a brew device including a beverage container table for receiving a beverage container and an overhead mounting a feed head spaced there above for emitting brewing liquid;
a tray holder mounted below the feed head;
an upwardly opening tray carried from the holder and including a perforated distribution plate and upstanding side walls defining a compartment configured to receive the charge of grind;

a platen carried from the overhead, sized to be received in such compartment, formed with a pattern of dispersing openings arrayed there across for flow of liquid from such feed head to be dispersed over such grind; and a spring biasing the platen downwardly.

53. A one cup beverage brewer for brewing a beverage from a predetermined charge of grind sufficient to brew a one cup beverage and comprising:

a brew device including a beverage container table for receiving a beverage container and an overhead mounting a feed head spaced there above for emitting brewing liquid;

a tray holder mounted below the feed head;

an upwardly opening tray carried from the holder and including a perforated distribution plate and upstanding side walls defining a compartment configured to receive the charge of grind;

a platen carried from the overhead, sized to be received in such compartment, formed with a pattern of dispersing openings arrayed there across for flow of liquid from such feed head; and a catch device for locking the platen in an elevated position relative to the tray.

54. A one cup coffee brewer comprising:

a tower including a container table and an overhang disposed thereover;

a feed head mounted on the overhang;

a holder for receiving a charge of coffee grind;

a platen for floatable receipt on the coffee grind in the compartment:

a spring biasing the platen downwardly; and flow distribution means in the platen and tray for receiving fluid flow from the feed head to direct it in controlled flow distribution through the packet toward the table.

55. A one cup beverage brewer for brewing a beverage grind in a porous wall packet and comprising:

a brew device housing including a container mounting table with a feed head disposed thereover for flowing brewing fluid toward the container;

a coffee packet holding device including a perforated distribution plate for flow of fluid and upstanding side walls defining a compartment for receipt of the packet;

a platen carried from the brewing device housings over the holder device and formed with a peripheral configuration complimenting the configuration of the side walls and cooperating therewith to form a perimetric clearance space, the platen including a pattern dispersing openings arrayed there across for flow of fluid from the feed head to be dispersed over through the packet toward the perforations in the distribution plate; and such platen being biased downwardly toward the distribution plate.

* * * * *

UNITED STATES PATENT AND TRADEMARK OFFICE
CERTIFICATE OF CORRECTION

PATENT NO. : 6,843,165 B2 Page 1 of 1
APPLICATION NO. : 10/255022
DATED : January 18, 2005
INVENTOR(S) : Arthur Stoner It is certified that error appears in the above-identified patent and that said Letters Patent is hereby corrected as shown below:

Col. 6, line 18
replace "b"
with --be--

Col. 6, line 19
replace "I"
with --It--

Col. 6, line 34
replace "The"
with --Then--

Col. 11, line 26
replace "carded"
with --carried--

Signed and Sealed this

Fifth Day of September, 2006

JON W. DUDAS
*Director of the United States Patent and Trademark Office*